US 6,737,964 B2

(12) United States Patent
Samman et al.

(10) Patent No.: US 6,737,964 B2
(45) Date of Patent: May 18, 2004

(54) VEHICLE BLIND SPOT MONITORING SYSTEM

(75) Inventors: Amer Mohammed Samman, Pleasanton, CA (US); Gregory Hugh Smith, Ann Arbor, MI (US); James Stewart Rankin, II, Novi, MI (US); Samuel Edward Ebenstein, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 189 days.

(21) Appl. No.: 09/682,981

(22) Filed: Nov. 5, 2001

(65) Prior Publication Data

US 2003/0085806 A1 May 8, 2003

(51) Int. Cl.⁷ .................................................. B60Q 1/00
(52) U.S. Cl. ........................ 340/436; 340/461; 340/903; 340/937; 345/4; 345/7; 348/42; 348/51; 348/148; 382/154
(58) Field of Search ................................ 340/436, 937, 340/425.5, 903, 435, 461, 462, 471; 348/148, 116, 51, 42, 43, 118; 382/154, 100, 270; 359/630, 866; 345/7, 4, 9

(56) References Cited

U.S. PATENT DOCUMENTS

| | | | |
|---|---|---|---|
| 5,325,096 A | | 6/1994 | Pakett |
| 5,424,952 A | * | 6/1995 | Asayama ................. 340/903 |
| 5,517,196 A | | 5/1996 | Pakett et al. |
| 5,793,308 A | * | 8/1998 | Rosinski et al. ......... 340/903 |
| 5,949,331 A | | 9/1999 | Schofield et al. |
| 6,078,355 A | * | 6/2000 | Zengel .................. 384/148 |
| 6,151,060 A | * | 11/2000 | Tabata ................... 348/51 |
| 6,184,781 B1 | * | 2/2001 | Ramakesavan .......... 340/435 |
| 6,396,946 B1 | * | 5/2002 | Sogawa ................. 382/154 |
| 6,498,620 B2 | * | 12/2002 | Schofield et al. ........ 348/148 |

* cited by examiner

Primary Examiner—Davetta W. Goins

(57) ABSTRACT

A blind spot monitoring system for a vehicle includes two pairs of stereo cameras, two displays and a controller. The stereo cameras monitor vehicle blind spots and generate a corresponding pair of digital signals. The display shows a rearward vehicle view and may replace, or work in tandem with, a side view mirror. The controller is located in the vehicle and receives two pairs of digital signals. The controller includes control logic operative to analyze a stereopsis effect between each pair of stereo cameras and the optical flow over time to control the displays. The displays will show an expanded rearward view when a hazard is detected in the vehicle blind spot and show a normal rearward view when no hazard is detected in the vehicle blind spot.

12 Claims, 1 Drawing Sheet

VEHICLE BLIND SPOT MONITORING SYSTEM

BACKGROUND OF INVENTION

1. Technical Field

The present invention relates generally to automotive control systems, and more particularly, to a vehicle blind spot monitoring system.

2. Background Art

A continuing problem that presents itself to operators of automotive vehicles is the difficulty in seeing obstacles near the vehicle but in a location that is difficult to observe from the driver's seat. Such regions are commonly referred to as "blind spots". For example, the angles between 90° and 170° from the forward direction of a vehicle (i.e., to the right and to the left of the vehicle and slightly behind the operator thereof) are common blind spots. These right-side and left-side blind spots are a source of numerous accidents when a driver makes a turn or a lane change and does not see another vehicle in the blind spot. Another common blind spot is the rear of a vehicle when backing up.

The most common solution to the problem of blind spots has been to use mirrors to aid the operator of the vehicle in determining whether obstacles are present in a blind spot. Such mirrors have been made in a variety of shapes and mounted in various locations to provide the operator with the greatest ability to detect obstacles in particular blind spots. For example, it is commonplace today to see a concave mirror mounted to the right side of a vehicle aimed at the right-side blind spot. Mirrors provide the operator with some information regarding the presence of obstacles in certain of a vehicle's blind spots, but they are less useful at night and under adverse weather conditions. Hence, a more complete and satisfactory solution is still sought by many.

A known alternative to the use of mirrors to detect obstacles in a vehicle's blind spots is to use optical or radar systems for sensing the presence of obstacles. These prior art techniques then generate a signal to the vehicle operator indicative of the presence of such an obstacle. Unfortunately, these systems only provide a visual or audible warning, and do not allow the vehicle operator to actually see what is in the vehicle's blind spot.

The disadvantages associated with these conventional blind spot monitoring techniques have made it apparent that a new technique for monitoring a vehicle's blind spots is needed. The new technique should enhance driver safety by providing a visual image of the vehicle's blind spot. Additionally, the new technique should be capable of replacing the conventional side view mirrors. The present invention is directed to these ends.

SUMMARY OF INVENTION

It is, therefore, an object of the invention to provide an improved and reliable vehicle blind spot monitoring system. Another object of the invention is to enhance driver safety by providing a visual image of the vehicle's blind spot. Additionally, the new technique should be capable of replacing a conventional side view mirrors.

In accordance with the objects of this invention, a vehicle blind spot monitoring system is provided. In one embodiment of the invention, a blind spot monitoring system for a vehicle includes a pair of stereo cameras on each side of the vehicle, two displays and a controller. Pairs of stereo cameras monitor vehicle blind spots and generate a corresponding pairs of digital signals. The displays show rearward vehicle views and may replace, or work in tandem with, the side view mirrors. The controller is located in the vehicle. The controller receives pair of the digital signals. The controller includes control logic operative to analyze a stereopsis effect between the pair of stereo cameras and the optical flow over time to control the display. The displays will show an expanded rearward view when a hazard is detected in the vehicle blind spot and show a normal rearward view when no hazard is detected in the vehicle blind spot.

The present invention thus achieves an improved vehicle blind spot monitoring system. The present invention is advantageous in that it enhances driver safety by providing an image of the vehicle's blind spots.

Additional advantages and features of the present invention will become apparent from the description that follows, and may be realized by means of the instrumentalities and combinations particularly pointed out in the appended claims, taken in conjunction with the accompanying drawings.

BRIEF DESCRIPTION OF DRAWINGS

In order that the invention may be well understood, there will now be described some embodiments thereof, given by way of example, reference being made to the accompanying drawings that represent the driver side of the vehicle only (the passenger side is the mirror image of the driver side), in which.

DETAILED DESCRIPTION

Figure 1:
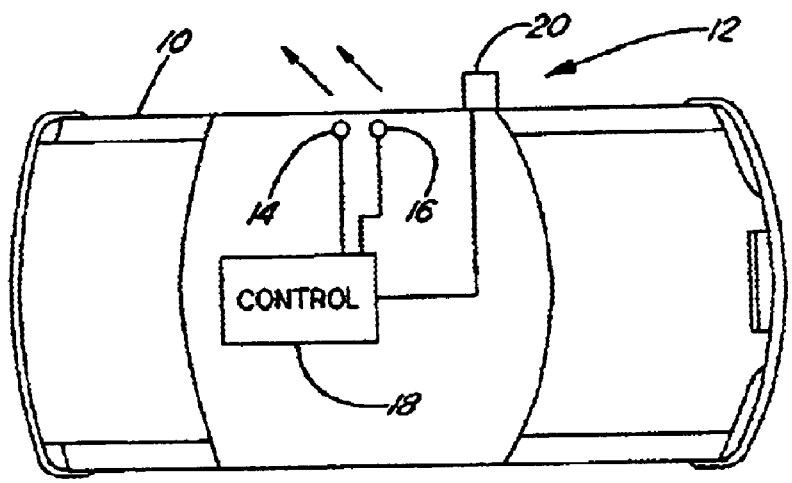
FIG. 1 is a block diagram of a vehicle having a vehicle blind spot monitoring system in accordance with one embodiment of the present invention.

[Best Modes for Carrying Out the Invention]

In the following figures, the same reference numerals will be used to identify identical components in the various views. Both figures represent the driver side of the vehicle only (the passenger side is the mirror image of the driver side). The present invention is illustrated with respect to a vehicle blind spots monitoring system, particularly suited for the automotive field. However, the present invention is applicable to various other uses that may require vehicle blind spots monitoring systems.

Referring to FIG. 1, a block diagram of a vehicle 10 having a vehicle blind spot monitoring system 12 in accordance with one embodiment of the present invention is illustrated. Vehicle blind spot monitoring system 12 includes a pair of stereo cameras 14, 16, a controller 18 having a plurality of computer algorithms, and a display 20.

While driving a vehicle, there are blind spots, i.e. an area not covered by looking at side mirrors, rear view mirrors, forward vision or peripheral. In many cases it is difficult or impossible to see this area even by turning the head because of obscuration by the B pillar. Objects in these areas are a hazard when a driver is turning, merging or changing lanes. The driver may be satisfied with the normal view from the mirrors most of the time, but when a hazard exists he/she needs to be warned and see the objects in the blind spots. A device, "intelligent side mirror" that can automatically provide a view of hazards in the blind spots when needed, but not disturb the normal view otherwise.

The present invention includes stereo cameras 14, 16 that monitor blind spots in a driver's normal vision. Stereo cameras 14, 16 are mounted on the driver side roof post in the present invention. Identical two cameras are mounted on the passenger side roof post (not shown here). One skilled in the art, however, would realize that there are alternative locations available for mounting. Most prior art cameras suffer from a phenomenon called "blooming". "Blooming" is a phenomenon where a camera is blinded when exposed to a bright light, such as vehicle headlights at night or when the sun shines into the camera. Cameras that are subject to "blooming" are therefore unsuitable in many conditions for driver use. The present invention uses enhanced CMOS cameras that cost less than $20 each in large volumes. These cameras have a very high dynamic range and onboard digital signal processing, so that they are suitable for night driving and aren't blinded by vehicle headlights or sunlight. The cameras also have a digital output so that they can interface directly with image processing hardware.

Controller 18 is located in vehicle 10 and is coupled to stereo cameras 14, 16, two identical cameras in the passenger side, display 20 and corresponding display on the passenger side. Controller 18 includes a microprocessor capable of processing data from cameras in real time to implement object detection algorithms. Controller 18 includes control logic (or computer algorithms) operative use the input from the cameras to detect motion in the vehicle blind spots and determine when a hazardous situation is occurring.

Display 20 is located in vehicle 10 and is coupled to and controlled by controller 18. Display 20 provides a normal side mirror view of the road under normal circumstances, but changes to a computer display when the system 12 determines that the driver needs to be warned about a hazard. At that time, the standard mirror display would be replaced by an extended camera image that shows the object in the blind spot. Display 20 and the corresponding display on the other side of the vehicle may augment a driver-side mirror or completely replace a driver-side mirror. In an alternative embodiment of the present invention, system 12 might highlight the hazard so that the driver's attention would be more easily attracted to the threat.

The present invention enhances driver safety by continually monitoring the blind-spots regions with two pairs of stereo cameras and alerting the driver of the presence of another vehicle. The present invention not only analyses the stereopsis effect between the two cameras, but also the optical flow over time. Stereopsis will allow the other vehicle to be detected based on its proximity to the "self" vehicle 10. Optical flow techniques will allow the other vehicle to be detected based on its behavior relative to the self vehicle 10, while the background scene will exhibit consistent flow in a backward direction, the other vehicle will remain stationary relative to the self vehicle 10, or even move forwards. This inconsistency relative to the background scene will be detected by system 12. The cameras 14, 16 are placed on the driver-side roof-post (two identical cameras are placed on the passenger side roof-post), facing rearwards, and cover a region of 60° relative to the side of the vehicle 10. This is approximately double the region covered by the side-mirrors.

Figure 2:
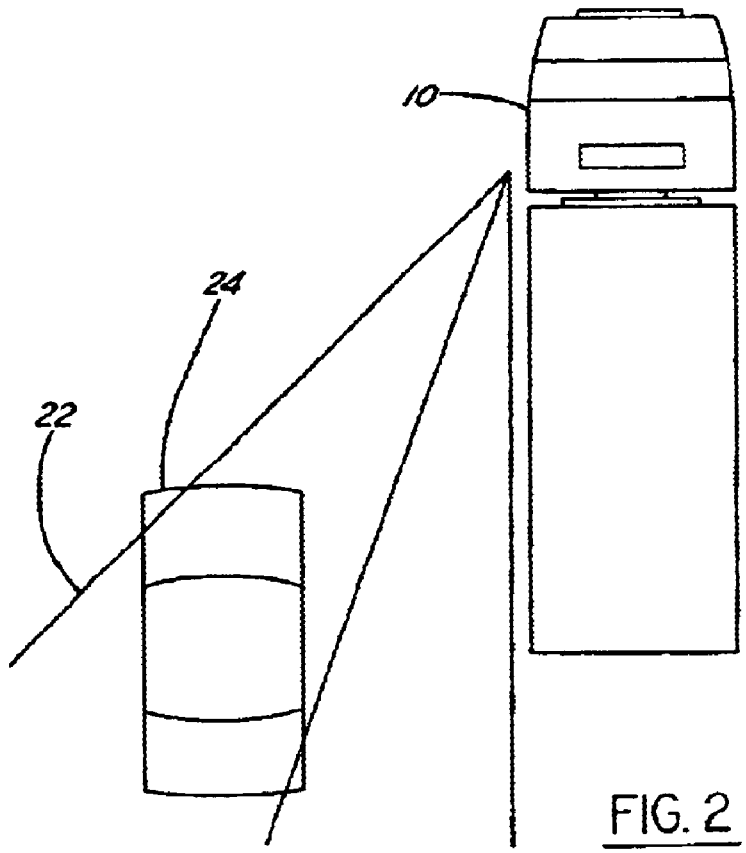
FIG. 2 is an illustration of the extra coverage area provided by a vehicle blind spot monitoring system in accordance with one embodiment of the present invention.

Referring to FIG. 2, the extra coverage area 22 provided by a vehicle blind spot monitoring system 12 in accordance with one embodiment of the present invention is illustrated. FIG. 2 illustrates the extra coverage 22 that system 12 will provide over a standard side-view mirror. This system 12 offers great benefits; it provides not only visualization of the blind spot to the driver, but also actively monitors the extra region 22. In the event of another vehicle 24 appearing in the blind-spot region 22, the driver will be alerted. This system could be incorporated into a vehicle in several ways. One such scenario would be the "intelligent side-mirror". The fundamental concept is that in the absence of vehicles in the blindspot, the system will simulate the side mirror, displaying the usual 30° region on a display the size of a side-mirror. If another vehicle is detected in the blind-spot region, the output view will be automatically slewed to include the detected hazard, thus alerting.

The present invention thus achieves an improved and reliable vehicle blind spots monitoring system by continually monitoring the vehicle's blind spots region with two pair of stereo cameras. In this way, the present invention enhances driver safety by providing a visual image of the vehicle's blind spots. Additionally, the present invention may be used to replace a conventional side view mirrors From the foregoing, it can be seen that there has been brought to the art a new and improved vehicle blind spots monitoring system. It is to be understood that the preceding description of the preferred embodiment is merely illustrative of some of the many specific embodiments that represent applications of the principles of the present invention. Clearly, numerous and other arrangements would be evident to those skilled in the art without departing from the scope of the invention as defined by the following claims:

What is claimed is:

1. A blind spot monitoring system for a vehicle comprising:
   two pairs of stereo cameras located in said vehicle and monitoring a vehicle blind spots, said pairs of stereo cameras generating pairs of digital signals;
   two displays located in said vehicle and displaying rearward vehicle views;
   a controller located in said vehicle, said controller coupled to said pairs of stereo cameras and receiving said pairs of digital signals, said controller coupled to and controlling said displays, said controller including control logic operative to analyze a stersopsis effect between said pairs of stereo cameras and an optical flow over time to control said displays to show an expanded rearward view when a hazard is detected in said vehicle blind spot and show a normal rearward view when no hazard is detected in said vehicle blind spot.

2. The system as recited in claim 1, wherein said pairs of stereo cameras are mounted on a driver and passenger side roof post facing rearwards.

3. The system as recited in claim 1, wherein said two pairs of stereo cameras are CMOS cameras.

4. The system as recited in claim 1, wherein said two pairs of stereo cameras are suitable for night driving and are not blinded by vehicle lights or sunlight.

5. The system as recited in claim 1, wherein said displays are used to replace a side view mirrors.

6. The system as recited in claim 1, wherein said normal rearward view has approximately a 30° viewing angle.

7. The system as recited in claim 1, wherein said expanded rearward view has approximately a 60° viewing angle.

8. The system as recited in claim 1, wherein said controller includes control logic operative to highlight said hazard.

9. The system as recited in claim 1, display is used in tandem with a side view mirror.

10. The system as recited in claim 1, wherein stereopsis effect allows said hazard to be detected based on proximity to said vehicle.

11. The system as recited in claim 1, wherein optical flow technique allows said hazard to be detected based on behavior relative to said vehicle.

12. A blind spot monitoring system for a vehicle comprising:
- a pair of stereo cameras located in the vehicle and monitoring a vehicle blind spot, said stereo pair of cameras generating digital signals;
- a display located in said vehicle and displaying a rearward vehicle view;
- a controller located in said vehicle, said controller coupled to said stereo pair of cameras and receiving said digital signals, said controller coupled to and controlling said display, said controller including control logic operative to analyze a stereopsis effect from said pair of stereo cameras and an optical flow over time to control said display to show an expanded rearward view when a hazard is detected in said vehicle blind spot and a normal rearward view when no hazard is detected in said vehicle blind spot.

* * * * *